United States Patent
Molnar

(10) Patent No.: US 7,055,634 B2
(45) Date of Patent: *Jun. 6, 2006

(54) WHEELCHAIR SUSPENSION

(75) Inventor: James H. Molnar, Bedford, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/762,977

(22) Filed: Jan. 22, 2004

(65) Prior Publication Data

US 2004/0159476 A1    Aug. 19, 2004

Related U.S. Application Data

(63) Continuation of application No. 09/974,348, filed on Oct. 10, 2001.

(51) Int. Cl.
*B60K 1/00* (2006.01)

(52) U.S. Cl. .................. 180/65.1; 180/907; 250/250.1; 250/220; 250/304.1; 297/DIG. 4

(58) Field of Classification Search .................. 280/5.2, 280/5.22, 5.26, 5.3, 5.32, DIG. 10, 250.1, 280/304.1, 220; 180/907, 65.1, 8.2; 297/DIG. 4
See application file for complete search history.

(56) References Cited

U.S. PATENT DOCUMENTS

| | | | |
|---|---|---|---|
| 2,427,482 A | 9/1947 | Weissman | |
| 3,174,176 A | 3/1965 | Olson | |
| 3,195,670 A | 7/1965 | Dunn | |
| 3,210,092 A | 10/1965 | Kraus | |
| 3,573,877 A | 4/1971 | Locke | |
| 3,589,700 A | 6/1971 | Ruet et al. | |
| 3,592,282 A | 7/1971 | Soileau | |
| 3,602,522 A | 8/1971 | Zamotin | |
| 3,661,228 A | 5/1972 | Glasser | |
| 3,664,450 A | 5/1972 | Udden et al. | |
| 3,709,313 A | 1/1973 | James | |
| 3,848,883 A | 11/1974 | Breacain | |
| 3,876,012 A | 4/1975 | Regier | |

(Continued)

FOREIGN PATENT DOCUMENTS

CA     2254372     5/2000

(Continued)

OTHER PUBLICATIONS

Quickie G-424 User Instruction Manual & Warranty, 930484 Rev. A (27 sheets) (alleged date not later than 2000).
10 Color photographs (8.5×11) of Quickie G-424 Wheelchair obtained Nov. 24, 2004.

(Continued)

*Primary Examiner*—Christopher P. Ellis
*Assistant Examiner*—Kelly E. Campbell
(74) *Attorney, Agent, or Firm*—Calfee, Halter & Griswold LLP

(57) ABSTRACT

The present invention has a plurality of pivoting linkages to lift and retract a front castor assembly to facilitate traversing an obstacle or rough terrain. In this regard, a wheelchair suspension having a frame member and at least one a pivoting assembly is provided. The pivoting assembly has, for example, a first linkage pivotally coupled to the frame member and a second linkage pivotally coupled to the frame member. At least one front caster assembly is coupled to the first and second linkages wherein upward pivotal movement of the first linkage causes the caster assembly to undergo upward vertical movement and upward pivotal movement of the second linkage causes the caster assembly to undergo lateral movement inward toward the wheelchair.

28 Claims, 6 Drawing Sheets

U.S. PATENT DOCUMENTS

| | | | |
|---|---|---|---|
| 3,883,153 A | 5/1975 | Singh et al. | |
| 3,905,437 A | 9/1975 | Kaiho et al. | |
| 3,917,312 A | 11/1975 | Rodaway | |
| 3,953,054 A | 4/1976 | Udden et al. | |
| 3,976,152 A | 8/1976 | Bell | |
| 4,119,163 A | 10/1978 | Ball | |
| 4,128,137 A | 12/1978 | Booth | |
| 4,222,449 A | 9/1980 | Feliz | |
| 4,264,085 A | 4/1981 | Volin | |
| 4,310,167 A * | 1/1982 | McLaurin | 280/5.28 |
| 4,333,681 A | 6/1982 | Nelson | |
| 4,337,958 A | 7/1982 | Witt et al. | |
| 4,341,278 A | 7/1982 | Meyer | |
| 4,375,295 A | 3/1983 | Volin | |
| 4,437,678 A | 3/1984 | Schultz | |
| 4,455,029 A | 6/1984 | Taylor | |
| 4,483,407 A | 11/1984 | Iwamoto et al. | |
| 4,500,102 A | 2/1985 | Haury et al. | |
| 4,513,832 A | 4/1985 | Engman | |
| 4,545,593 A | 10/1985 | Farnam | |
| 4,556,229 A | 12/1985 | Bihler et al. | |
| 4,565,385 A | 1/1986 | Morford | |
| RE32,242 E | 9/1986 | Minnebraker | |
| 4,618,155 A | 10/1986 | Jayne | |
| 4,687,068 A | 8/1987 | Pagett | |
| 4,721,322 A | 1/1988 | Hawkins | |
| 4,759,418 A | 7/1988 | Goldenfeld et al. | |
| 4,805,712 A | 2/1989 | Singleton | |
| 4,811,966 A | 3/1989 | Singleton | |
| 4,823,900 A | 4/1989 | Farnam | |
| 4,826,194 A | 5/1989 | Sakita | |
| 4,861,056 A | 8/1989 | Duffy, Jr. et al. | |
| 4,886,294 A | 12/1989 | Nahachewski | |
| 4,919,441 A | 4/1990 | Marier et al. | |
| 4,926,952 A | 5/1990 | Farnam | |
| 4,934,626 A | 6/1990 | Kimura | |
| 4,962,942 A | 10/1990 | Barnett et al. | |
| 5,123,495 A | 6/1992 | Littlejohn et al. | |
| 5,176,393 A | 1/1993 | Robertson et al. | |
| 5,180,275 A | 1/1993 | Czech et al. | |
| 5,222,567 A | 6/1993 | Broadhead et al. | |
| 5,228,709 A | 7/1993 | Kao | |
| 5,230,522 A | 7/1993 | Gehlsen et al. | |
| 5,241,876 A | 9/1993 | Mathis | |
| 5,248,007 A | 9/1993 | Watkins et al. | |
| 5,290,055 A | 3/1994 | Treat, Jr. | |
| 5,294,141 A | 3/1994 | Mentessi et al. | |
| 5,316,328 A | 5/1994 | Bussinger | |
| 5,341,533 A | 8/1994 | Seitz | |
| 5,351,774 A | 10/1994 | Okamoto | |
| 5,372,211 A | 12/1994 | Wilcox et al. | |
| 5,435,404 A | 7/1995 | Garin | |
| 5,447,317 A | 9/1995 | Gehlsen et al. | |
| 5,467,838 A | 11/1995 | Wu | |
| 5,513,875 A | 5/1996 | Tahara et al. | |
| 5,518,081 A | 5/1996 | Thibodeau | |
| 5,531,284 A | 7/1996 | Okamoto | |
| 5,540,297 A | 7/1996 | Meier | |
| 5,562,172 A | 10/1996 | Mick | |
| 5,564,512 A | 10/1996 | Scheulderman | |
| 5,575,348 A | 11/1996 | Goertzen et al. | |
| 5,611,555 A | 3/1997 | Vidal | |
| 5,727,802 A | 3/1998 | Garven et al. | |
| 5,772,237 A | 6/1998 | Finch et al. | |
| D397,645 S | 9/1998 | Schaffner | |
| 5,833,248 A | 11/1998 | Eguchi | |
| 5,848,658 A * | 12/1998 | Pulver | 180/65.1 |
| 5,851,019 A | 12/1998 | Gill et al. | |
| 5,853,059 A | 12/1998 | Goertzen et al. | |
| D404,693 S | 1/1999 | Schaffner | |
| 5,855,387 A * | 1/1999 | Gill et al. | 280/283 |
| 5,904,214 A | 5/1999 | Lin | |
| 5,944,131 A | 8/1999 | Schaffner et al. | |
| 5,954,351 A | 9/1999 | Koschinat | |
| 5,964,473 A * | 10/1999 | Degonda et al. | 280/250.1 |
| 6,003,624 A | 12/1999 | Jorgensen et al. | |
| 6,041,876 A | 3/2000 | Pulver et al. | |
| 6,047,979 A | 4/2000 | Kraft et al. | |
| 6,062,600 A | 5/2000 | Kamen et al. | |
| 6,070,898 A | 6/2000 | Dickie et al. | |
| 6,079,725 A | 6/2000 | Lazaros | |
| D429,665 S | 8/2000 | Dickie | |
| 6,129,165 A * | 10/2000 | Schaffner et al. | 180/65.1 |
| 6,131,679 A | 10/2000 | Pulver et al. | |
| 6,176,335 B1 | 1/2001 | Schaffner et al. | |
| 6,179,076 B1 | 1/2001 | Fernie | |
| 6,186,252 B1 | 2/2001 | Schaffner et al. | |
| 6,196,343 B1 | 3/2001 | Strautnieks | |
| 6,199,647 B1 | 3/2001 | Schaffner et al. | |
| 6,206,119 B1 | 3/2001 | Wu | |
| 6,209,670 B1 | 4/2001 | Fernie et al. | |
| 6,225,894 B1 | 5/2001 | Kyrtsos | |
| 6,234,263 B1 | 5/2001 | Boivin et al. | |
| 6,234,507 B1 | 5/2001 | Dickie et al. | |
| 6,279,927 B1 | 8/2001 | Nishihira et al. | |
| 6,312,000 B1 | 11/2001 | Pauls et al. | |
| 6,322,089 B1 | 11/2001 | Dantele et al. | |
| 6,341,671 B1 | 1/2002 | Ebersole | |
| 6,347,688 B1 | 2/2002 | Hall et al. | |
| 6,357,793 B1 * | 3/2002 | Dickie et al. | 280/755 |
| 6,405,816 B1 | 6/2002 | Kamen et al. | |
| 6,428,020 B1 | 8/2002 | Steadman | |
| 6,454,286 B1 | 9/2002 | Hosino | |
| 6,460,641 B1 | 10/2002 | Kral | |
| 6,533,305 B1 | 3/2003 | Falk | |
| 6,533,306 B1 | 3/2003 | Watkins | |
| 6,543,564 B1 | 4/2003 | Kamen et al. | |
| 6,543,798 B1 | 4/2003 | Schaffner et al. | |
| 6,554,086 B1 | 4/2003 | Goertzen et al. | |
| 6,568,030 B1 * | 5/2003 | Watanabe et al. | 16/44 |
| 6,581,711 B1 * | 6/2003 | Tuluie | 180/227 |
| 6,588,799 B1 | 7/2003 | Sanchez | |
| 6,640,916 B1 | 11/2003 | Schaffner et al. | |
| 2002/0023787 A1 | 2/2002 | Kamen et al. | |
| 2002/0175027 A1 | 11/2002 | Usherovich | |
| 2003/0030243 A1 | 2/2003 | Engels et al. | |
| 2003/0075365 A1 | 4/2003 | Fought | |
| 2003/0122332 A1 | 7/2003 | Engels et al. | |
| 2003/0168265 A1 | 9/2003 | Goertzen et al. | |
| 2004/0032119 A1 | 2/2004 | Tran et al. | |

FOREIGN PATENT DOCUMENTS

| | | |
|---|---|---|
| CA | 2254372 A1 * | 5/2000 |
| DE | 10126368 A1 | 2/2003 |
| DE | 10126368 C2 | 2/2003 |
| DE | 10126369 A1 | 2/2003 |
| DE | 10126369 C2 | 2/2003 |
| DE | 10136368 A1 * | 2/2003 |
| EP | 127929 | 12/1984 |
| EP | 0677285 | 10/1995 |
| EP | 677285 A1 * | 10/1995 |
| EP | 0908165 | 4/1999 |
| EP | 0908166 | 4/1999 |
| EP | 0988848 | 3/2000 |
| EP | 1279391 | 1/2003 |
| EP | 1279392 | 1/2003 |
| FR | 2399822 | 3/1979 |
| FR | 2498925 | 8/1982 |
| JP | 04-158864 | 6/1992 |
| JP | 07-328073 | 12/1995 |
| JP | 08-038552 | 2/1996 |
| JP | 2000102569 | 4/2000 |
| JP | 2000288032 | 10/2000 |

| | | |
|---|---|---|
| JP | 2001070347 | 3/2001 |
| JP | 2001104391 | 4/2001 |
| JP | 2001212181 | 8/2001 |
| JP | 2001258948 | 9/2001 |
| JP | 2001327545 | 11/2001 |
| JP | 2002143223 | 5/2002 |
| JP | 2002165841 | 6/2002 |
| WO | WO 82/00445 | 2/1982 |
| WO | WO 84/04451 | 11/1984 |
| WO | WO 92/09463 | 6/1992 |
| WO | WO 93/24342 | 12/1993 |
| WO | WO 98/46184 | 10/1998 |
| WO | WO 00/08910 | 2/2000 |
| WO | WO 00/09356 | 2/2000 |
| WO | WO/09356 A1 * | 2/2000 |
| WO | WO 00/12040 | 3/2000 |
| WO | WO 00/66060 | 11/2000 |
| WO | WO 02/34190 | 5/2002 |
| WO | WO 03/030800 | 4/2003 |

OTHER PUBLICATIONS

"Big Bounder Power Wheelchair: Conventional "Tubular" Style Frame"; http://www.wheelchair.com/bigbounderpage.htm, Accessed on the World Wide Web on Dec. 17, 2003, p. 1-4.

"Bounder Plus Power Wheelchair: Convention "Tubular" Style Frame"; http://www.wheelchairs.com/plus.htm, Accessed on the World Wide Web on Dec. 17, 2003, p. 1-5.

"Frog Legs: Smooth Ride Ahead"; http://www.froglegsinc.com/index.php, Accessed on the World Wide Web on Dec. 17, 2003, p. 1-3.

"Frog Legs Tires", http://www.mdtap.org/tt/1999.09/prod.html, Accessed on the World Wide Web on Dec. 17, 2003, p. 1-3.

"Invacare pronto M71 jr. Power Wheelchair Manual"; Accessed on the World Wide Web on Dec. 17, 2003, p. 1-4.

"Invacare Storm Series TDX Power Wheelchairs Manual"; Accessed on the World Wide Web on Dec. 17, 2003, p. 1-24.

"Invacare Xterra Series GT Power Wheelchair Manual", Accessed on the World Wide Web on Dec. 17, 2003, p. 1-4.

"Jazzy 1122", Pride Mobile Products Corp., Accessed on the World Wide Web on Dec. 17, 2003, p. 1-2.

"Jazzy 1133", Pride Mobile Products Corp., Accessed on the World Wide Web on Dec. 17, 2003, p. 1-2.

"Jazzy 1170XL", Pride Mobile Products Corp., Accessed on the World Wide Web on Dec. 17, 2003, p. 1-2.

"Bruno Independent Living Aids ISO 9001 Certified"; http://www.bruno.com/power_chairs.htm, Accessed on the World Wide Web on Dec. 17, 2003, p. 1-5.

"Top End Terminator SS Sports Wheelchair"; http://www.phc-online.com/terminator_ss.htm, Accessed on the World Wide Web on Dec. 17, 2003, p. 1-5.

"Transactions of the Institute of Measurement and Control", The British Library of Science Technology and Business, vol. 24, Nov. 5, 2002, p. 1-15.

M. J. Lawn, et al., "Modeling of a Stair-Climbing Wheelchair Mechanism with High Single-Step Capability", IEEE Transactions on Neutral Systems and Rehabilitation Engineering, vol. II, No. 3, Sep. 2003, p. 323-332.

Sunrise Medical, Inc., Power Products Parts Manual, 930307 Rev. K (531 Sheets), Jul. 2004. (Note: various dates are alleged therein based on wheelchair products listed including the Quickie G-424).

* cited by examiner

WHEELCHAIR SUSPENSION

CROSS-REFERENCE TO RELATED APPLICATIONS

This application is a continuation of pending U.S. patent application Ser. No. 09/974,348, filed Oct. 10, 2001 and titled "Wheelchair Suspension."

FIELD OF THE INVENTION

The invention relates generally to conveyances and, more particularly, to wheelchair suspensions capable of lifting and retracting a forward caster in traversing an obstacle.

BACKGROUND OF THE INVENTION

Wheelchairs are an important means of transportation for a significant portion of society. Whether manual or powered, wheelchairs provide an important degree of independence for those they assist. However, this degree of independence can be limited if the wheelchair is required to traverse obstacles such as, for example, curbs that are commonly present at sidewalks, driveways, and other paved surface interfaces.

In this regard, most wheelchairs have front and rear casters to stabilize the chair from tipping forward or backward and to ensure that the drive wheels are always in contact with the ground. One such wheelchair is disclosed in U.S. Pat. No. 5,435,404 to Garin. On such wheelchairs, the caster wheels are typically much smaller than the driving wheels and located both forward and rear of the drive wheels. Though this configuration provided the wheelchair with greater stability, it made it difficult for such wheelchairs to climb over obstacles such as, for example, curbs or the like, because the front casters could not be driven over the obstacle due to their small size and constant contact with the ground.

U.S. Pat. No. 5,964,473 to Degonda et al. describes a wheelchair having front and rear casters similar to Garin and a pair of additional forward lift wheels. The lift wheels are positioned off the ground and slightly forward of the front caster. Configured as such, the lift wheels first engage a curb and cause the wheelchair to tip backwards. As the wheelchair tips backwards, the front caster raises off the ground to a height so that it either clears the curb or can be driven over the curb.

U.S. Pat. No. 6,196,343 to Strautnieks also describes a wheelchair having front and rear casters. The front casters are each connected to a pivot arm that is pivotally attached to the sides of the wheelchair frame. Springs bias each pivot arm to limit the vertical movement thereof. So constructed, each front caster can undergo vertical movement when running over an obstacle.

While the above-mentioned art provides various ways of addressing the need for managing a front caster when traversing an obstacle such as a curb, disadvantages still exist. For example, when undergoing vertical movement, many front casters also undergo forward lateral movement. While vertical movement assists in traversing an obstacle, forward lateral movement potentially works against traversing an obstacle because the front caster is usually moved laterally toward the obstacle so as to potentially prematurely make contact with the obstacle.

Hence, it is desirable to provide a wheelchair suspension that does not suffer from the above-mentioned disadvantages.

SUMMARY OF THE INVENTION

The present invention has a plurality of pivoting linkages to lift and retract a front castor assembly to facilitate traversing an obstacle or rough terrain. In one embodiment, a wheelchair suspension having a frame member and at least one a pivoting assembly is provided. The pivoting assembly has, for example, a first linkage pivotally coupled to the frame member and a second linkage pivotally coupled to the frame member. At least one front caster assembly is coupled to the first and second linkages wherein upward pivotal movement of the first linkage causes the caster assembly to undergo upward vertical movement and upward pivotal movement of the second linkage causes the caster assembly to undergo lateral movement.

Therefore, it is an advantage of the present invention to provide a wheelchair suspension for traversing obstacles and rough terrain.

It is yet another advantage of the present invention to provide a wheelchair suspension capable of lifting and retracting a front caster assembly when traversing obstacles and rough terrain.

It is still further an advantage of the present invention to provide a wheelchair suspension that maintains all of its wheels in contact with the ground.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The present invention provides a wheelchair and suspension for traversing obstacles and rough terrain. The present invention facilitates the traversing of obstacles and rough terrain by allowing for the vertical and lateral movement of one or more front caster assemblies coupled to the wheelchair. The lateral movement of the present invention is of special assistance when traversing obstacles or rough terrain because it draws the front caster assemblies in towards the wheelchair as the caster assemblies undergo vertical movement. Such operation provides the wheelchair with additional clearance when overcoming the obstacle or rough terrain.

Figure 1:
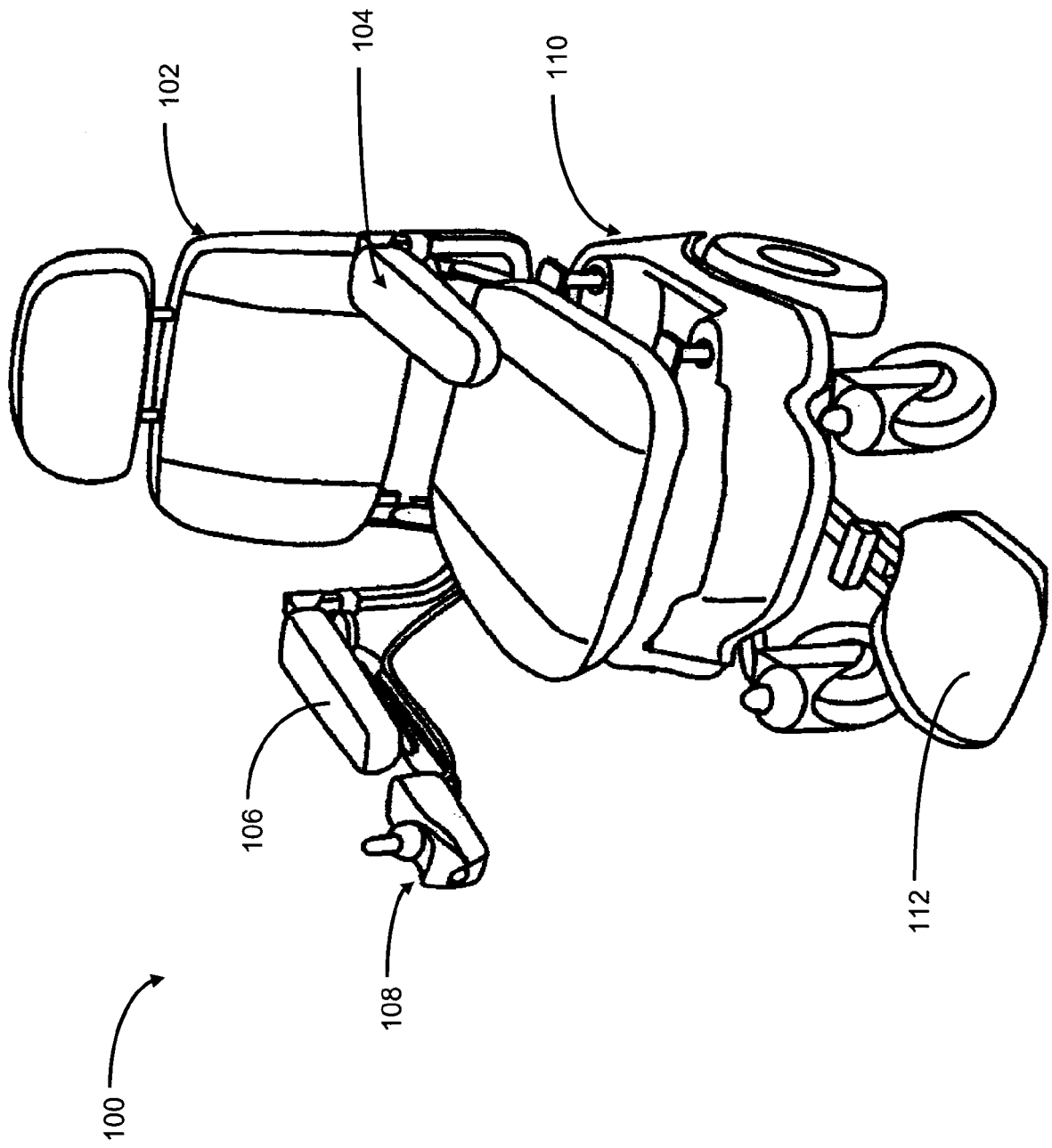
FIG. 1 is a perspective view of a wheelchair incorporating the suspension of the present invention.

Referring now to FIG. 1, a perspective view of a wheelchair 100 of the present invention is shown. Wheelchair 100 is preferably a mid-wheel drive or rear-wheel drive wheelchair. As shown, wheelchair 100 has a chair 102 having arm supports 104 and 106. A control device such as, for example, a joystick controller 108 is attached to the chair 102 for controlling any power-related aspects of wheelchair 100. Wheelchair 100 further has removable decorative shrouds 110 covering the wheelchair's suspension, drive, and control systems. Projecting forward from the shrouds 110 is footrest 112 for supporting the feet of the wheelchair's user.

Figure 2:
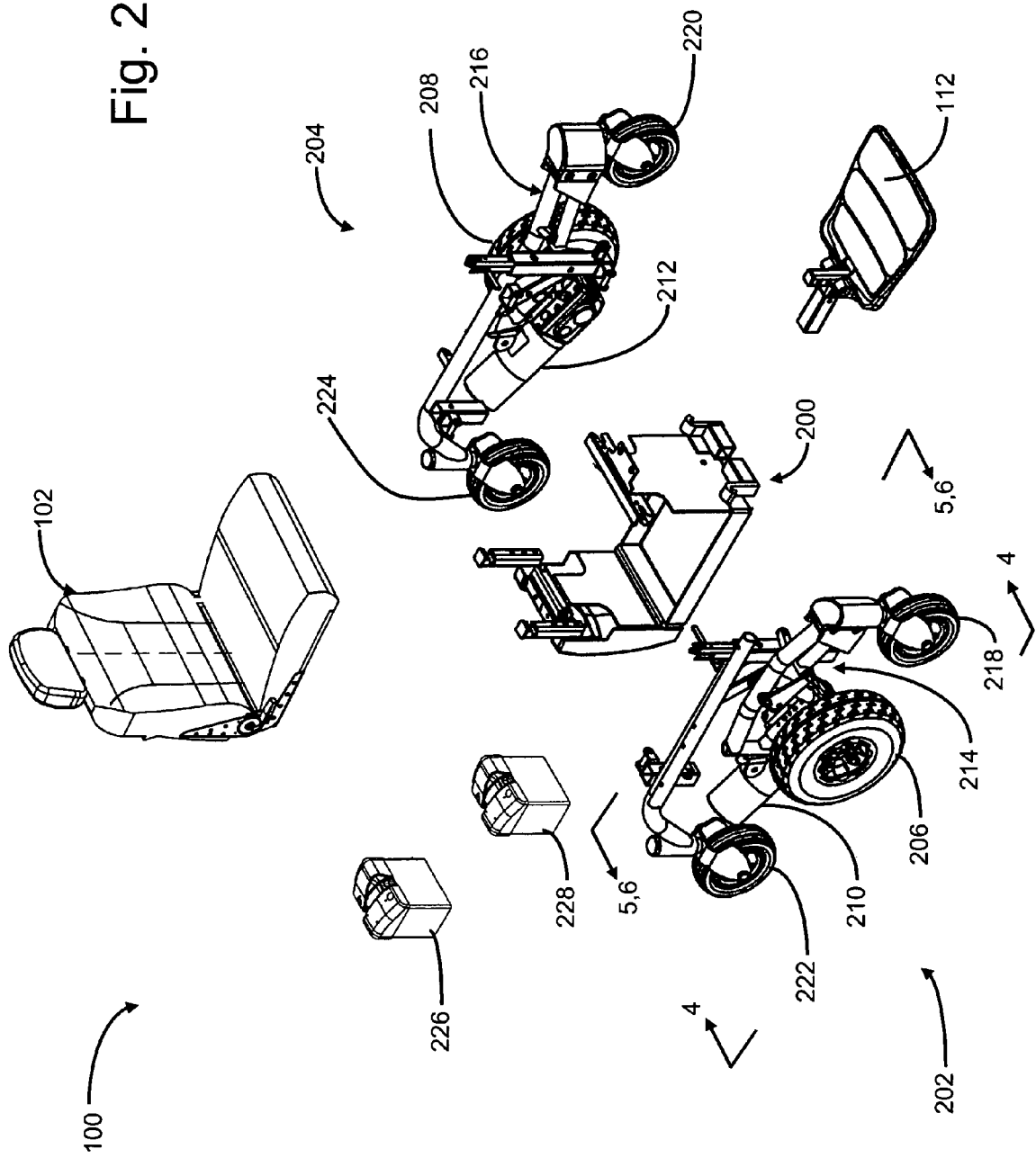
FIG. 2 is an exploded perspective view of certain components of the wheelchair of FIG. 1.

Illustrated in FIG. 2 is an exploded perspective view of certain components of wheelchair 100. The suspension system has a sub-frame 200 for accommodating, among other things, removable batteries 226 and 228. Removably attached to sub-frame 200 are first and second side frame assemblies 202 and 204. Side frame assemblies 202 and 204 are removably attached to sub-frame 202 via interfaces preferably in the form of spring loaded hooks and latches. The spring loaded hooks preferably reside on sub-frame 200 with the corresponding latches residing on side frame assemblies 202 and 204. In this manner, an individual can manually with out the use of tools take apart wheelchair 100 for easy transportation in, for example, the trunk of a car or other large vehicle.

Each side frame assembly has at least one drive assembly having a motor drive 210 and 212 and a drive wheel 206 and 208. Each motor drive 210 and 212 preferably has either a motor/gear box combination or a brushless, gearless motor. Each side frame assembly further has at least one front caster assembly 218 and 220 coupled thereto via pivoting assemblies 214 and 216. At least one rear caster assembly 222 and 224 are also provided for each side frame assembly. Each of the side frame assemblies are identical in construction and, hence, the present discussion will focus on describing side frame assembly 202 with the understanding that such discussion is equally applicable to side frame assembly 204.

Figure 3:
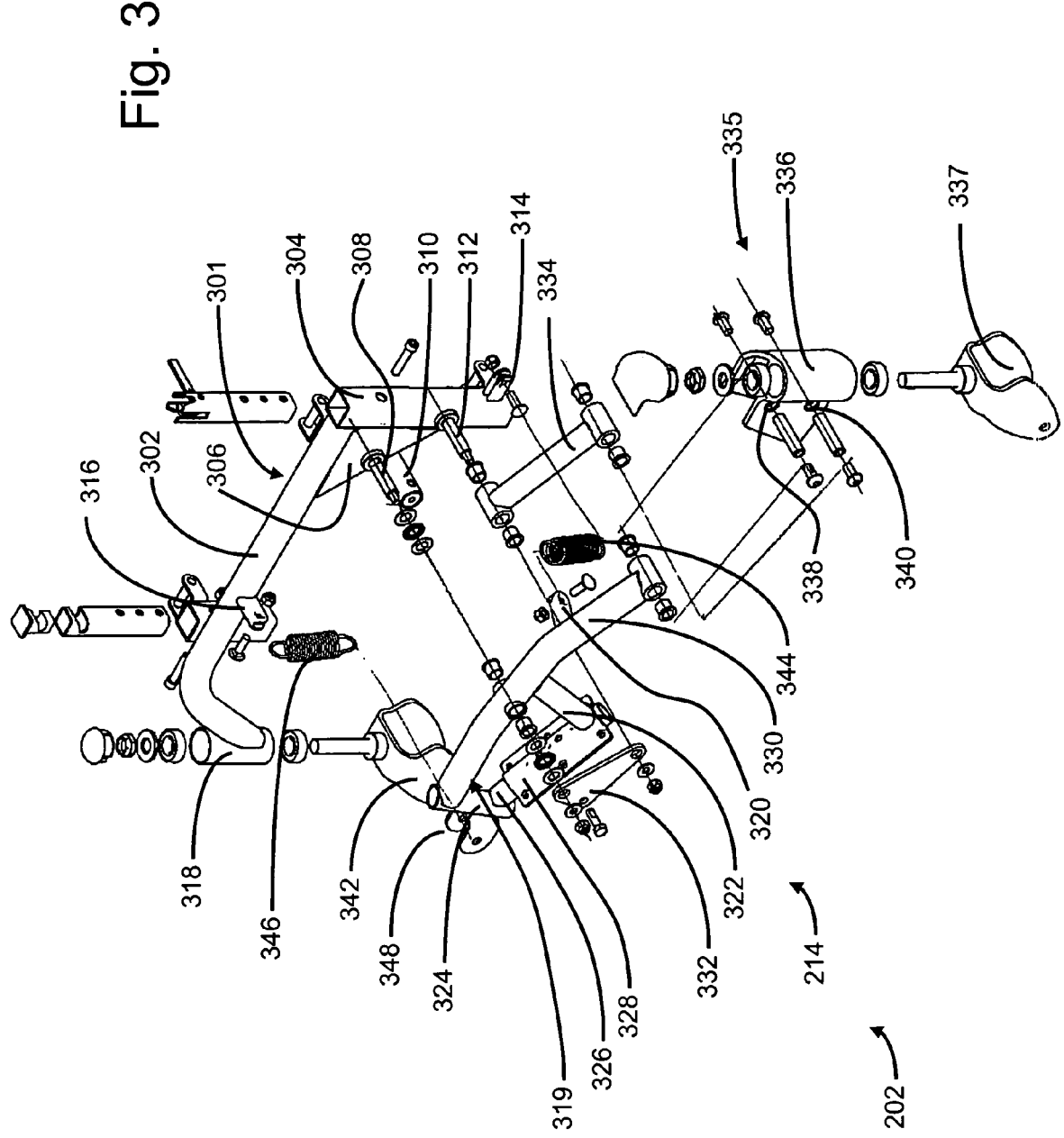
FIG. 3 is an exploded detail view of certain components of a side frame assembly of the present invention.

Referring now to FIG. 3, an exploded detailed perspective of certain components of side frame simply 202 is shown. In this regard, side frame assembly 202 has a side frame member 301 having sub-members 302, 304, 306, and 318. These side frame sub-members are preferably tubular (i.e., circular, oval, or rectangular in cross-section) and formed and welded together has shown. Pivoting assembly 214 has a first pivoting linkage 319 defined by sub-linkages 320, 322, 324, and 326. These sub-linkages are also preferably tubular in configuration, as described above, and formed and welded together as shown. Sub-linkage 326 has a motor drive assembly mounting bracket 328 attached thereto. A second pivoting linkage 334 is also provided. As shown in FIG. 3, the overall length of the first pivoting linkage 319 is greater than the overall length of the second pivoting linkage 334. As will be presently described, this configuration facilitates, for example, the dual functions of lifting and retracting the front caster assembly 335 away from the obstacle to be traversed and inward toward the wheelchair.

The first pivoting linkage 319 is pivotally coupled to side frame member 301 via tubular stud or extension 308. The second pivoting linkage 334 is pivotally coupled to side through member 301 via tubular stud or extension 312. A compression plate 332 is provided for additional stability and is coupled to side frame member 301 via tubular studs or extensions 308 and 312 and pivot stop member 310.

Resilient extension springs 344 and 346 are provided between side frame member 301 and first pivoting linkage 319. In this regard, spring 344 has a first connection to frame member 301 via bracket 314 and a second connection to first pivoting linkage 319 via bracket 330. Spring 346 has a first connection to frame member 301 via bracket 316 and a second connection to first pivoting linkage 319 via bracket 348. As will be described in more detail, extension springs 344 and 346 are connected to first pivoting linkage 319 on either side of the linkages pivotal connection to side frame member 301 and provide a unidirectional bias force around the first pivoting linkage 319 pivotal coupling to side frame member 301. Alternatively, resilient elastomeric members can be integrated into the pivotal coupling between first pivoting linkage 319 and side frame member 301. Similarly, resilient elastomeric members can be integrated into the pivotal coupling between second pivoting linkage 334 and side frame member 301. Such resilient elastomeric members can be "Rosta"-type bearings or other similar structures.

A front caster assembly 335 is pivotally coupled to each of the first and second pivoting linkages 319 and 334. In this regard, front caster assembly 335 has an integral head tube/bracket 336 for receiving a caster fork 337 and making the aforementioned pivotal couplings to linkages 319 and 334. These pivotal couplings to linkages 319 and 334 are facilitated by first and second holes 338 and 340 in head tube/bracket 336 and corresponding tubular formations in first and second pivoting linkages 319 and 334. A rear caster is attached to side frame assembly 301 via rear caster fork 342, which is received in sub-frame member 318.

Configured as such, first and second pivoting linkages 319 and 334 pivot with respect to side frame member 301. Moreover, front caster assembly 335 undergoes spatial displacement with the pivotal movement of first and second pivoting linkages 319 and 334. The rear caster wheel and fork 342 are generally not affected by the pivotal movement of first and second pivoting linkages 319 and 334.

Figure 4:
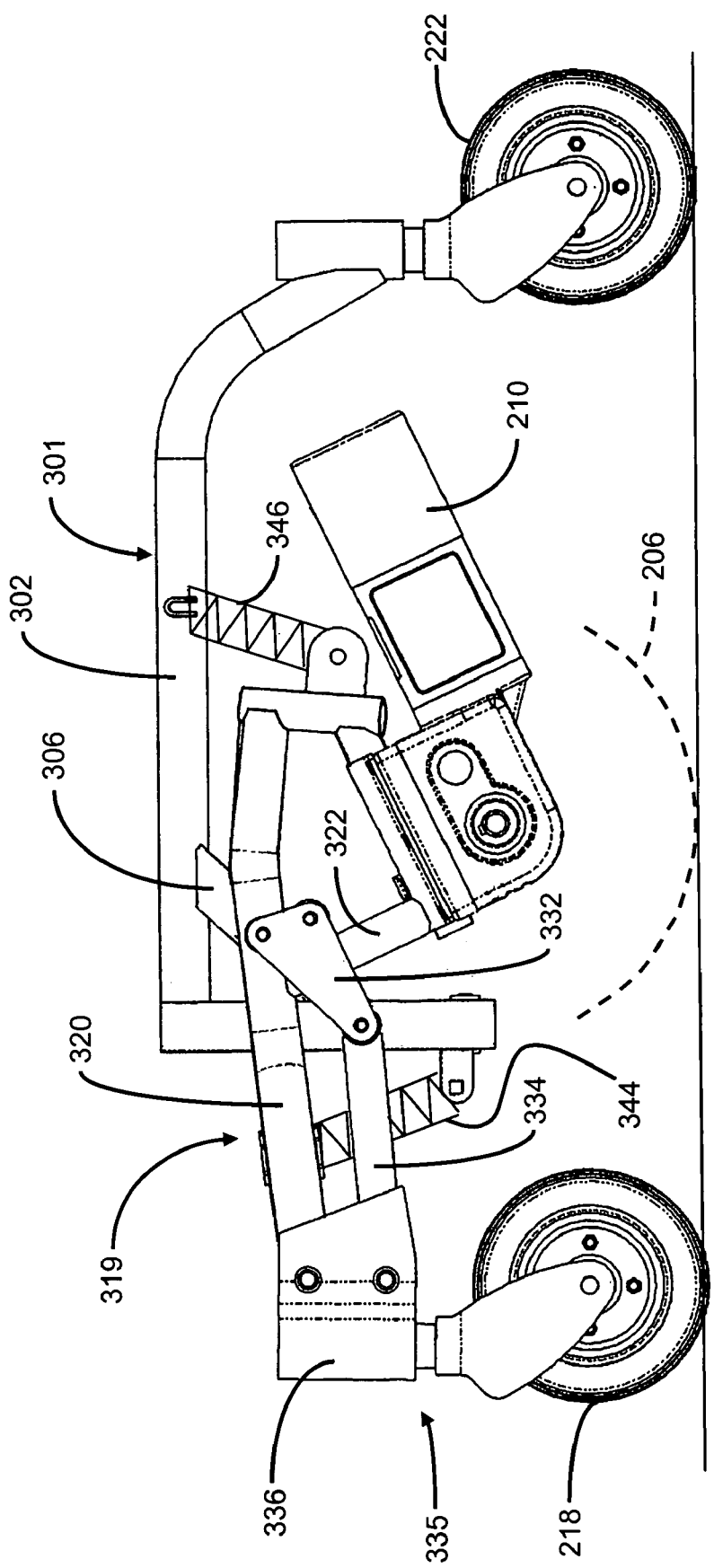
FIG. 4 is a side elevational view of the side frame assembly under static conditions.

Referring now to FIG. 4, an outer side elevational view of side frame assembly 202 is shown under static conditions (i.e., the wheelchair is standing still or neither accelerating or decelerating). Drive wheel 206 is only partially shown so to not obscure the relevant components of side frame assembly 202. In this state, all wheels including the drive wheels and front and rear caster wheels are in contact and maintain contact with the ground or other riding surface.

Figure 5:
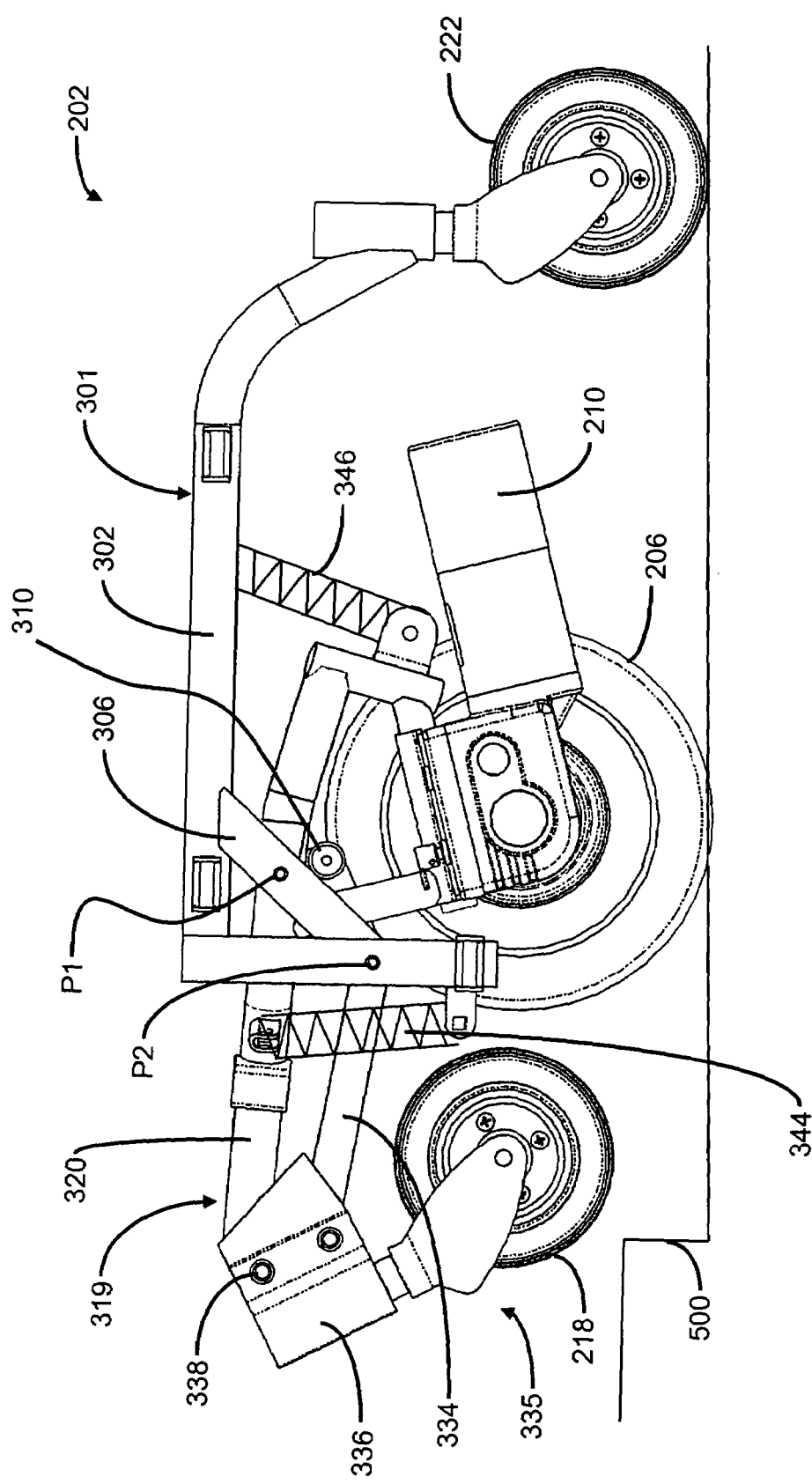
FIG. 5 is a side elevational view of the side frame assembly traversing an obstacle by ascending an obstacle.

Referring now to FIG. 5, an inner side elevational view of side frame assembly 202 is shown as the wheelchair traverses an elevated obstacle. The component displacement shown in FIG. 5 normally occurs when the wheelchair is quickly accelerated forward to traverse an obstacle such as curb 500. For purposes of the present discussion, the pivotal coupling between first pivoting linkage 319 and side frame member 301 is designated by pivot P1. Similarly, the pivotal coupling between the second pivoting linkage 334 and side frame member 301 is designated by pivot P2. In relationship to each other, it can be seen that pivot P2 is below and laterally offset from pivot P1 in a direction toward the front caster. In other words, pivot P2 is laterally closer to front caster assembly 335 than is pivot P1. In combination with the respective overall lengths of first and second pivoting linkages 319 and 334, this configuration provides the dual functions of lifting and retracting the front caster assembly 335 away from the obstacle to be traversed and inward toward the wheelchair.

In this regard, when the wheelchair is accelerated forward by a high rate, the resulting moment arm generated by the drive wheel 206 will exceed the resultant moment arm generated by springs 344 and 346. This causes first pivoting linkage 319 to pivot or rotate in a clockwise direction about pivot P1 thereby raising front caster assembly 335. This motion also causes second pivoting linkage 334 to undergo pivotal motion. The resulting effect of second pivoting linkage 334 motion is to cause front caster assembly 335 to pivot about its pivotal coupling 338 to first pivoting linkage 319. This pivotal movement causes front caster assembly 335 to be drawn inward toward the wheelchair itself and way from the obstacle 500 being traversed. The maximum amount of pivotal movement is limited by stop 310, which physically engages side frame member 301 sub-linkage 320. The same effect described above is achieved should side frame assembly 202 be driven directly over obstacle 500. Once the resultant movement arm generated by drive wheel 206 is less than the resultant movement arm generated by springs 344 and 346 with respect to pivot P1 front caster assembly 335 is lowered.

Figure 6:
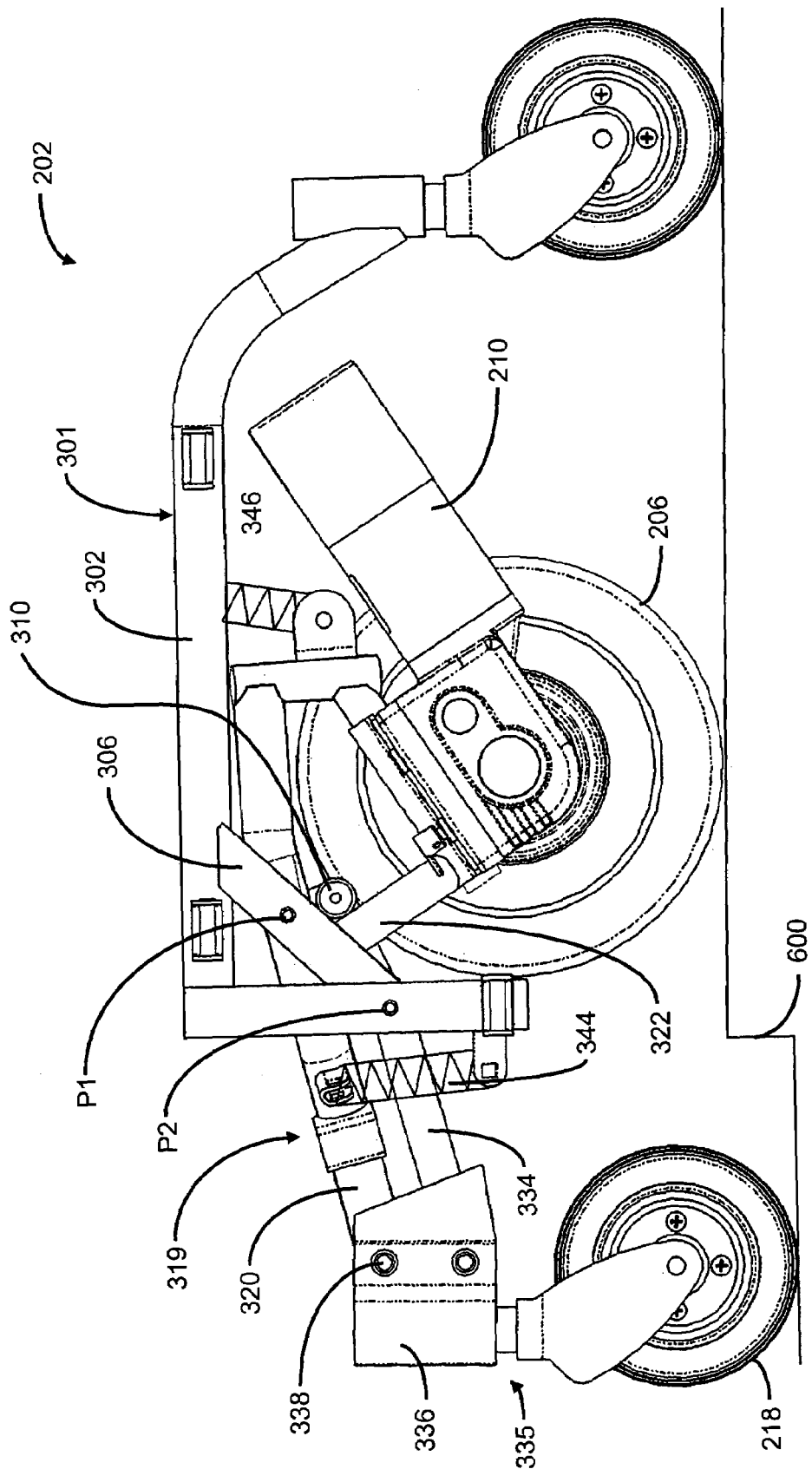
FIG. 6 is a side elevational view of the side frame assembly traversing an obstacle by descending the obstacle.

Referring now to FIG. 6, an inner side elevational view of side frame assembly 202 is shown as the wheelchair traverses descends an obstacle 600. In this regard, the resultant moment arm generated by springs 344 and 346 is greater than any other moment arm around pivot P1. This causes first pivoting linkage 319 to rotate counter-clockwise and to lower the front caster assembly 335 on the lower supporting or riding surface. In this regard, the respective position of pivot P2 and the overall length of second pivoting linkage 334 compared to the position of pivot P1 and the overall length of first pivoting linkage 319 provide for front caster assembly 335 to descend to the lower supporting surface. Concurrently therewith, the pivotal motion of second pivoting linkage 334 causes front caster assembly 335 to pivot about its pivotal coupling 338 to first pivoting linkage 319. This motion causes front caster assembly 335 to extend forward. The combined effect of lowering and extending front caster assembly 335 provide the wheelchair with greater stability when descending a obstacle because the wheelchair is sooner and longer in contact with the differing elevations that represent the obstacle. The maximum pivotal movement is once again limited by stop 310, which physically engages side frame member 301 sub-linkage 322 in this scenario.

Hence, the present invention facilitates the traversing of obstacles and rough terrain by allowing for the vertical and lateral movement of one or more front caster assemblies. The lateral movement of the front caster assemblies is of special assistance when traversing an obstacle because it draws the front caster assemblies in towards the wheelchair as the caster assemblies undergo upward vertical movement. For downward vertical movement, the present invention provides for the front caster assemblies to undergo lateral movement forward and away from the wheelchair.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, a plurality of casters can be used instead of one caster, the casters can be coupled to the pivot arms via shock absorbing fork assemblies, and the specific locations of the pivotal couplings can be modified so long as the above-described overall relationships are maintained. Therefore, the invention, in its broader aspects, is not limited to the specific details, the representative apparatus, and illustrative examples shown and described. Accordingly, departures can be made from such details without departing from the spirit or scope of the applicant's general inventive concept.

I claim:

1. A wheelchair comprising:
a frame member;
at least one pivoting assembly having:
a first linkage pivotally coupled to the frame member; and
a second linkage pivotally coupled to the frame member;
a drive assembly coupled to the first linkage;
at least one rear caster; and
a third linkage coupled to the first and second linkages wherein upward pivotal movement of the first linkage causes the third linkage to undergo upward movement and upward pivotal movement of the second linkage causes the third linkage to undergo lateral movement toward the drive assembly.

2. The wheelchair of claim 1 wherein the first linkage comprises a drive assembly mount.

3. The wheelchair of claim 1 wherein the first linkage comprises a first length and the second linkage comprises a second length and wherein the first and second lengths are different.

4. The wheelchair of claim 1 wherein the first linkage comprises a forward portion and a rearward portion and wherein the rearward portion comprises a drive assembly mount and wherein the forward portion comprises a pivot joint for connection with the third linkage.

5. The wheelchair of claim 4 wherein the first linkage further comprises a second pivot joint for connection with the frame member.

6. The wheelchair of claim 5 wherein the second pivot joint comprises an elastomeric member.

7. The wheelchair of claim 1 wherein the first linkage comprises a first pivot joint and the second linkage comprises a second pivot joint and wherein the first and second pivot joints connect the first and second linkages, respectively, to the frame.

8. The wheelchair of claim 7 wherein the second pivot joint is vertically offset from the first pivot joint.

9. The wheelchair of claim 7 wherein the second pivot joint comprises an elastomeric member.

10. The wheelchair of claim 1 wherein the second linkage minimizes the lateral movement of a front caster attached to the pivoting assembly when the front caster is raised from a supporting surface of the suspension by the first linkage.

11. The wheelchair of claim 1 wherein the second linkage minimizes the forward lateral movement of a front caster attached to the pivoting assembly when the front caster is raised from a supporting surface of the suspension by the first linkage.

12. The wheelchair of claim 1 wherein the second linkage draws a front caster attached to the pivoting assembly towards the drive assembly when the front caster is raised from a supporting surface of the suspension by the first linkage.

13. The wheelchair of claim 1 wherein the third linkage comprises a bracket having first and second distal ends, the first and second distal ends each comprising an aperture.

14. A wheelchair comprising:
a frame member;
a pivoting assembly having:
a first linkage pivotally coupled to the frame member, the first linkage comprising a drive assembly mount; and
a second linkage pivotally coupled to the frame member;
a drive assembly attached to the first linkage drive assembly mount;
at least one rear caster; and
at least one front caster assembly comprising a head tube, the front caster assembly head tube coupled to one of the first or second linkages wherein upward pivotal movement of the first linkage causes the front caster assembly head tube to undergo upward movement and upward pivotal movement of the second linkage causes the front caster assembly head tube to undergo lateral movement.

15. The wheelchair of claim 14 wherein the first linkage comprises a first length and the second linkage comprises a second length and wherein the first and second lengths are different.

16. The wheelchair of claim 14 wherein the first linkage further comprises a pivot joint for connection with the frame member.

17. The wheelchair of claim 14 wherein the first linkage comprises a first pivot joint and the second linkage comprises a second pivot joint and wherein the first and second pivot joints connect the first and second linkages, respectively, to the frame.

18. The wheelchair of claim 17 wherein the second pivot joint is vertically offset from the first pivot joint.

19. The wheelchair of claim 17 wherein the second pivot joint comprises an elastomeric member.

20. The wheelchair of claim 14 wherein the head tube is coupled to the second linkage.

21. A wheelchair comprising:
a frame member;
a pivoting assembly having:
  a first linkage pivotally coupled to the frame, the first linkage comprising a drive assembly mount; and
  a second linkage pivotally coupled to the frame;
a drive assembly attached to the first linkage drive assembly mount;
at least one rear caster; and
at least one front caster assembly coupled to one of the first or second linkages wherein upward pivotal movement of one of the first or second linkages causes upward pivotal movement of the other of the first or second linkages and causes the front caster assembly to undergo upward movement.

22. The wheelchair of claim 21 wherein the first linkage comprises a first length and the second linkage comprises a second length and wherein the first and second lengths are different.

23. The wheelchair of claim 22 wherein the first linkage further comprises a pivot joint for connection with the frame.

24. The wheelchair of claim 22 wherein the first linkage comprises a first pivot joint and the second linkage comprises a second pivot joint and wherein the first and second pivot joints connect the first and second linkages, respectively, to the frame.

25. The wheelchair of claim 24 wherein the second pivot joint is vertically offset from the first pivot joint.

26. The wheelchair of claim 21 wherein the second linkage minimizes the lateral movement of the front caster assembly when the front caster assembly is raised from a supporting surface of the suspension by the first linkage.

27. The wheelchair of claim 21 wherein the second linkage minimizes the forward lateral movement of the front caster assembly when the front caster assembly is raised from a supporting surface of the suspension by the first linkage.

28. The wheelchair of claim 21 wherein the second linkage draws the front caster assembly towards the frame when the front caster is raised from a supporting surface of the suspension by the first linkage.

* * * * *